US012108335B2

(12) United States Patent
Shan et al.

(10) Patent No.: US 12,108,335 B2
(45) Date of Patent: Oct. 1, 2024

(54) WAKE UP SIGNAL SENDING METHOD AND DEVICE

(71) Applicant: HUAWEI TECHNOLOGIES CO., LTD., Guangdong (CN)

(72) Inventors: Baokun Shan, Shenzhen (CN); Hong Wang, Beijing (CN); Odile Rollinger, Cambridge (GB); Brian Alexander Martin, Reading (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 441 days.

(21) Appl. No.: 17/370,474

(22) Filed: Jul. 8, 2021

(65) Prior Publication Data

US 2021/0337476 A1    Oct. 28, 2021

Related U.S. Application Data

(63) Continuation of application No. PCT/CN2019/071225, filed on Jan. 10, 2019.

(51) Int. Cl.
*H04W 52/02* (2009.01)

(52) U.S. Cl.
CPC ............... *H04W 52/0235* (2013.01)

(58) Field of Classification Search
CPC ........ H04W 52/0235; H04W 52/0219; H04W 52/0229; H04W 52/028; H04W 52/0216; G06F 1/3209; Y02D 30/70
See application file for complete search history.

(56) References Cited

U.S. PATENT DOCUMENTS

2022/0086759 A1 *   3/2022   Höglund ............. H04W 68/005

FOREIGN PATENT DOCUMENTS

| CN | 104244381 A | 12/2014 | |
|---|---|---|---|
| CN | 107735975 A | 2/2018 | |
| CN | 108924913 A | 11/2018 | |
| WO | 2018082400 A1 | 5/2018 | |
| WO | WO-2020199806 A1 * | 10/2020 | ........ H04W 52/0219 |

OTHER PUBLICATIONS

Lenova Motorola Mobility, Consideration on wake up signal, Oct. 12, 2018, 3GPP TSG-RAN WG2 Meeting $103bis/R2-1814766, 4pgs.*
Huawei et al., "Group based wake-up signal," 3GPP TSG-RAN WG2 Meeting #104, R2-1816400, Spokane, USA, Nov. 12-16, 2018, 3 pages.

(Continued)

*Primary Examiner* — Joseph E Dean, Jr.
(74) *Attorney, Agent, or Firm* — Fish & Richardson P.C.

(57) ABSTRACT

Examples in this application provides methods and devices for sending wake-up signals. One example method may include receiving, from a core network device, a first category which a terminal device belongs to, where the first category corresponds to a first service feature, receiving, from a network device, a configuration of a plurality of wake-up signals, determining a to-be-monitored wake-up signal in the plurality of wake-up signals based on the first category, and monitoring the to-be-monitored wake-up signal.

20 Claims, 4 Drawing Sheets

(56) References Cited

OTHER PUBLICATIONS

3GPP TS 23.401 V16.1.0 (Dec. 2018), "3rd Generation Partnership Project; Technical Specification Group Services and System Aspects; General Packet Radio Service (GPRS) enhancements for Evolved Universal Terrestrial Radio Access Network (E-UTRAN) access (Release 16)," Dec. 2018, 411 pages.
ZTE Corporation, "Consideration on UE-group wake-up signal for NB-IoT and eMTC," 3GPP TSG-RAN WG2 Meeting#103bis, R2-1814382, Chengdu, China, Oct. 8-12, 2018, 5 pages.
3GPP TS 23.501 V15.4.0 (Dec. 2018), "3rd Generation Partnership Project; Technical Specification Group Services and System Aspects; System Architecture for the 5G System; Stage 2 (Release 15)," Dec. 2018, 236 pages.
3GPP TS 24.301 V15.5.0 (Dec. 2018), "3rd Generation Partnership Project; Technical Specification Group Core Network and Terminals; Non-Access-Stratum (NAS) protocol for Evolved Packet System (EPS); Stage 3 (Release 15)," Dec. 2018, 536 pages.
3GPP TS 24.501 V15.2.0 (Dec. 2018), "3rd Generation Partnership Project; Technical Specification Group Core Network and Terminals; Non-Access-Stratum (NAS) protocol for 5G System (5GS); Stage 3 (Release 15)," Dec. 2018, 455 pages.
3GPP TS 36.304 V15.1.0 (Sep. 2018), "3rd Generation Partnership Project; Technical Specification Group Radio Access Network; Evolved Universal Terrestrial Radio Access (E-UTRA); User Equipment (UE) procedures in idle mode (Release 15)," Sep. 2018, 55 pages.

3GPP TS 36.331 V15.3.0 (Sep. 2018), "3rd Generation Partnership Project; Technical Specification Group Radio Access Network; Evolved Universal Terrestrial Radio Access (E-UTRA); Radio Resource Control (RRC); Protocol specification (Release 15)," Sep. 2018, 918 pages.
3GPP TS 36.413 V15.4.0 (Dec. 2018), "3rd Generation Partnership Project; Technical Specification Group Radio Access Network; Evolved Universal Terrestrial Radio Access Network (E-UTRAN); S1 Application Protocol (S1AP) (Release 15)," Dec. 2018, 383 pages.
3GPP TS 38.413 V15.2.0 (Dec. 2018), 3rd Generation Partnership Project; Technical Specification Group Radio Access Network; NG-RAN; NG Application Protocol (NGAP) (Release 15), Dec. 2018, 308 pages.
PCT International Search Report and Written Opinion in International Application No. PCT/CN2019/071225, dated Jul. 3, 2019, 14 pages.
Nokia, Nokia Shanghai Bell, "Analysis of Group WUS Options," 3GPP TSG-RAN WG2 Meeting #104, R2-1817048, Spokane, USA, Nov. 12-16, 2018, 5 pages.
Office Action issued in Chinese Application No. 201980077627.8 on Jan. 6, 2022, 16 pages.
Extended European Search Report issued in European Application No. 19909109.1 on Dec. 7, 2021, 9 pages.
Lenovo et al., "Consideration on wake up signal," 3GPP TSG-RAN WG2 Meeting #103bis, R2-1814766, Chengdu, China, Oct. 8-12, 2018, 4 pages.
Nokia et al., "Wake-up signal configurations and procedures," 3GPP TSG RAN WG1 Meeting #92bis, R1-1804249, Sanya, China, Apr. 16-20, 2018, 8 pages.

* cited by examiner

WAKE UP SIGNAL SENDING METHOD AND DEVICE

CROSS-REFERENCE TO RELATED APPLICATIONS

This application is a continuation of International Application No. PCT/CN2019/071225, filed on Jan. 10, 2019, the disclosure of which is hereby incorporated by reference in its entirety.

TECHNICAL FIELD

This application relates to the field of communication technologies, and in particular, to a wake up signal sending method and a device.

BACKGROUND

To cope with explosive growth of mobile data traffic, massive device connections, and various constantly emerging new services and application scenarios in the future, a 5th generation (5G) wireless communication technology emerges. The 5G wireless communication technology is an extension of a 4th generation (4G) wireless communication technology.

In a wireless communication technology, to reduce power consumption of a terminal device to monitor a physical downlink control channel (PDCCH) for paging, a concept of wake up signal (WUS) is introduced before each paging subframe (Paging Occasion, PO). The terminal device needs to monitor, in a conventional manner and on a corresponding PO, the PDCCH for paging, only after the terminal device detects, before the PO, a WUS. However, a plurality of terminal devices share one PO and a WUS before the PO. Therefore, provided that any terminal device belonging to the PO needs to be paged, another terminal device that is not paged also detects the WUS before the PO. To prevent a terminal device that is not paged from also detecting the WUS before the PO, a base station configures a plurality of wake up signals. A configuration of the plurality of wake up signals includes a mapping relationship between group information and a wake up signal. In other words, different group information corresponds to different wake up signals. In addition, the base station sends the configuration of the plurality of wake up signals to a terminal device, so that the terminal device may calculate, based on an identifier of the terminal device, a group to which the terminal device belongs, and then determine, based on the group and the mapping relationship, a wake up signal that the terminal device needs to monitor, so as to monitor the wake up signal, without a need to monitor a wake up signal corresponding to another group. In this way, when a terminal in a group needs to be paged, only a terminal device in the group detects the WUS before the PO, and a terminal device in another group does not detect the WUS before the PO, and therefore is not woken up. Theoretically, a quantity of woken-up terminal devices is decreased, thereby reducing a false alarm probability of paging.

However, in the foregoing grouping manner, only theoretically the quantity of woken-up terminal devices is decreased and the false alarm probability of paging is reduced, but another factor that affects wake-up of a terminal device is not considered. Therefore, how to effectively reduce the false alarm probability of paging is a technical problem to be urgently resolved by a person skilled in the art.

SUMMARY

This application provides a wake up signal sending method and a device, to reduce a false alarm probability of paging, thereby reducing power consumption of a terminal device that is not paged.

According to a first aspect, an embodiment of this application provides a wake up signal sending method. The wake up signal sending method may include:

receiving, from a core network device, a first category to which a terminal device belongs, where different categories correspond to different service features;

receiving a configuration of a plurality of wake up signals from a network device;

determining a to-be-monitored wake up signal in the plurality of wake up signals based on the first category; and monitoring the to-be-monitored wake up signal.

In a possible implementation, the service feature includes at least one of a probability that the terminal device is paged, or an uplink/downlink service trigger type. The probability that the terminal device is paged is determined based on a quantity of communication times of the terminal device per unit time. If the quantity of communication times is less than a preset threshold, it may be determined that the terminal device is of the uplink service trigger type. On the contrary, if the quantity of communication times is greater than or equal to the preset threshold, it may be determined that the terminal device is of the downlink service trigger type. The preset threshold may be set based on an actual requirement. Herein, a value of the preset threshold is not specifically limited in the embodiments of this application. As an understanding, the probability that the terminal device is paged may also reflect the quantity of communication times of the terminal device per unit time.

In this embodiment of this application, the different categories correspond to the different service features. Service features of terminal devices corresponding to the first category are the same, that is, terminal devices belonging to the first category have a same service feature. This is understood as that terminal devices belonging to a first type have a same service feature. It may be understood that, herein the same service feature cannot be understood, in a limited manner, as that the service features are absolutely the same, and may alternatively be understood as that the service features are similar. For example, when the terminal device is a mobile phone or a computer, and both the mobile phone and the computer correspond to downlink service trigger, it may be considered that the mobile phone and the computer have a same service feature. When the terminal device is a water meter or a smoke alarm, the water meter and the smoke alarm almost do not involve downlink service trigger, and have a relatively low probability of being paged, it may be considered that the water meter and the smoke alarm have similar service features. It should be noted that when it is determined, by using probability values of being paged, whether two terminal devices have a same service feature, if the two terminal devices have equal probability values of being paged, it may be considered that the two terminal devices have a same service feature. Alternatively, if the two terminal devices have probability values of being paged that are not equal, but a difference between the probability values of being paged is less than a preset threshold, it may also be considered that the two terminal devices have a same service feature. The preset threshold may be set based on an actual requirement. Herein, a value of the preset threshold is not specifically limited in the embodiments of this application.

Therefore, it can be learned that, compared with a current technology, according to the wake up signal sending method provided in this embodiment of this application, a group to which the terminal device belongs is not simply determined based on an identifier of the terminal device, but a service feature of the terminal device is considered, for example, the uplink/downlink service trigger type of the terminal device or the probability that the terminal device is paged, the first category to which the terminal device belongs is determined based on the service feature of the terminal device, and then the to-be-monitored wake up signal is determined in the plurality of wake up signals based on the first category corresponding to the service feature. In this way, when any terminal device in the first category is paged, only a terminal device that has a same uplink/downlink service trigger type or has a same or similar probability of being paged is woken up, and another terminal device that is not paged is not woken up. This reduces a false alarm probability of paging, thereby reducing power consumption of a terminal device that is not paged.

In a possible implementation, the configuration of the plurality of wake up signals may include a mapping relationship between category information and a wake up signal, and the determining a to-be-monitored wake up signal in the plurality of wake up signals based on the first category may include:

determining the to-be-monitored wake up signal in the plurality of wake up signals based on the first category and the mapping relationship between category information and a wake up signal. In this way, a wake up signal corresponding to the first category may be searched for based on the first category and the mapping relationship between category information and a wake up signal, so as to determine the to-be-monitored wake up signal, where the wake up signal corresponding to the first category is the to-be-monitored wake up signal that the terminal device needs to monitor.

In a possible implementation, the determining a to-be-monitored wake up signal in the plurality of wake up signals based on the first category may include:

determining the to-be-monitored wake up signal in the plurality of wake up signals based on the first category and a grouping factor. In this way, the to-be-monitored wake up signal may be determined based on both the first category and the grouping factor.

In a possible implementation, the determining the to-be-monitored wake up signal in the plurality of wake up signals based on the first category and a grouping factor may include:

determining a plurality of to-be-determined wake up signals in the plurality of wake up signals based on the first category; and determining the to-be-monitored wake up signal in the plurality of to-be-determined wake up signals based on the grouping factor.

In a possible implementation, the determining the to-be-monitored wake up signal in the plurality of wake up signals based on the first category and a grouping factor may include:

determining a plurality of to-be-determined wake up signals in the plurality of wake up signals based on the grouping factor; and determining the to-be-monitored wake up signal in the plurality of to-be-determined wake up signals based on the first category.

In a possible implementation, Before the receiving, from a core network device, a first category to which a terminal device belongs, the method may further include:

sending the service feature of the terminal device to the core network device, so that after receiving the service feature sent by the terminal device, the core network device may determine, based on the service feature, the category to which the terminal device belongs.

In a possible implementation, the wake up signal sending method may further include:

If the to-be-monitored wake up signal indicates that the terminal device is to be paged, a physical downlink control channel is monitored in a paging subframe corresponding to the to-be-monitored wake up signal; or if the to-be-monitored wake up signal indicates that the terminal device is not to be paged, a physical downlink control channel is not monitored in a paging subframe corresponding to the to-be-monitored wake up signal, in other words, the terminal device may continue to maintain a current sleep state or power saving state.

In a possible implementation, terminal devices having different service features have different probabilities of being paged.

According to a second aspect, an embodiment of this application further provides a wake up signal sending method. The wake up signal sending method may include:

sending, to a terminal device, a first category to which the terminal device belongs, where different categories correspond to different service features; and sending a paging message to a network device, where the paging message may include an identifier of the terminal device and the first category, and the paging message is used to indicate the network device to determine a to-be-monitored wake up signal in a plurality of wake up signals based on the first category, and send the to-be-monitored wake up signal to the terminal device based on the identifier of the terminal device.

In a possible implementation, the service feature includes at least one of a probability that the terminal device is paged, or an uplink/downlink service trigger type.

In a possible implementation, the probability that the terminal device is paged is determined based on a quantity of communication times of the terminal device per unit time.

In a possible implementation, before the sending, to a terminal device, a first category to which the terminal device belongs, the method may further include:

determining, based on a service feature of the terminal device, the first category to which the terminal device belongs.

In a possible implementation, before the determining, based on a service feature of the terminal device, the first category to which the terminal device belongs, the method may further include:

receiving the service feature of the terminal device sent by the terminal device.

According to a third aspect, an embodiment of this application further provides a wake up signal sending method. The wake up signal sending method may include:

sending a configuration of a plurality of wake up signals to a terminal device;

receiving a paging message sent by a core network device, where the paging message may include an identifier of the terminal device and a first category to which the terminal device belongs, where different categories correspond to different service features;

determining a to-be-monitored wake up signal in the plurality of wake up signals based on the first category; and sending the to-be-monitored wake up signal to the terminal device based on the identifier of the terminal device.

In a possible implementation, the service feature includes at least one of a probability that the terminal device is paged, or an uplink/downlink service trigger type.

In a possible implementation, the probability that the terminal device is paged is determined based on a quantity of communication times of the terminal device per unit time.

In a possible implementation, the configuration of the plurality of wake up signals may include a mapping relationship between category information and a wake up signal, and the determining a to-be-monitored wake up signal in the plurality of wake up signals based on the first category may include:

determining the to-be-monitored wake up signal in the plurality of wake up signals based on the first category and the mapping relationship between category information and a wake up signal.

In a possible implementation, the determining a to-be-monitored wake up signal in the plurality of wake up signals based on the first category may include:

determining the to-be-monitored wake up signal in the plurality of wake up signals based on the first category and a grouping factor.

In a possible implementation, the determining the to-be-monitored wake up signal in the plurality of wake up signals based on the first category and a grouping factor may include:

determining a plurality of to-be-determined wake up signals in the plurality of wake up signals based on the first category; and determining the to-be-monitored wake up signal in the plurality of to-be-determined wake up signals based on the grouping factor.

In a possible implementation, the determining the to-be-monitored wake up signal in the plurality of wake up signals based on the first category and a grouping factor may include:

determining a plurality of to-be-determined wake up signals in the plurality of wake up signals based on the grouping factor; and determining the to-be-monitored wake up signal in the plurality of to-be-determined wake up signals based on the first category.

According to a fourth aspect, an embodiment of this application further provides a communication device. The communication device may include a processor.

The processor is configured to: be coupled to a memory, and read and execute instructions in the memory, to implement the wake up signal sending method shown in any implementation of the first aspect.

In a possible implementation, the communication device may further include the memory.

According to a fifth aspect, an embodiment of this application further provides a core network device. The core network device may include a processor.

The processor is configured to: be coupled to a memory, and read and execute instructions in the memory, to implement the wake up signal sending method shown in any implementation of the second aspect.

In a possible implementation, the core network device may further include the memory.

According to a sixth aspect, an embodiment of this application further provides a network device. The network device may include a processor.

The processor is configured to: be coupled to a memory, and read and execute instructions in the memory, to implement the wake up signal sending method shown in any implementation of the third aspect.

In a possible implementation, the network device may further include: the memory.

According to a seventh aspect, an embodiment of this application further provides a computer storage medium. The computer storage medium may include instructions, and when the instructions are run on a communication device, the communication device is enabled to perform the wake up signal sending method shown in any implementation of the first aspect.

According to an eighth aspect, an embodiment of this application further provides a computer storage medium. The computer storage medium may include instructions, and when the instructions are run on a core network device, a communication device is enabled to perform the wake up signal sending method shown in any implementation of the second aspect.

According to a ninth aspect, an embodiment of this application further provides a computer storage medium. The computer storage medium may include instructions, and when the instructions are run on a network device, a communication device is enabled to perform the wake up signal sending method shown in any implementation of the third aspect.

According to a tenth aspect, an embodiment of this application further provides a communication system. The communication system may include a core network device and a network device. The core network device is configured to perform the wake up signal sending method shown in any implementation of the second aspect.

The network device is configured to perform the wake up signal sending method shown in any implementation of the third aspect.

In a possible implementation, the system further includes a communication device, and the communication device is configured to perform the wake up signal sending method shown in any implementation of the first aspect.

According to the wake up signal sending method and the device that are provided in the embodiments of this application, the terminal device receives, from the core network device, the first category to which the terminal device belongs, where the different categories correspond to the different service features; and receives the configuration of the plurality of wake up signals from the network device. In this way, after the first category and the configuration of the plurality of wake up signals are separately received, the to-be-monitored wake up signal may be determined in the plurality of wake up signals based on the first category, and the to-be-monitored wake up signal may be monitored. It can be learned that, compared with the current technology, according to the wake up signal sending method and the device provided in the embodiments of this application, the group to which the terminal device belongs is not simply determined based on the identifier of the terminal device, but the service feature of the terminal device is considered, for example, the uplink/downlink service trigger type of the terminal device or the probability that the terminal device is paged, the first category to which the terminal device belongs is determined based on the service feature of the terminal device, and then the to-be-monitored wake up signal is determined in the plurality of wake up signals based on the first category corresponding to the service feature. In this way, when any terminal device in the first category is paged, only the terminal device that has the same uplink/downlink service trigger type or has the same or similar probability of being paged is woken up, and the another terminal device that is not paged is not woken up. This reduces a false alarm probability of paging, thereby reducing the power consumption of the terminal device that is not paged.

DESCRIPTION OF EMBODIMENTS

The embodiments of this application may be used for a long term evolution (LTE) architecture, or may be used for a universal mobile telecommunications system (UMTS) terrestrial radio access network (UTRAN) architecture, or a global system for mobile communications (GSM)/enhanced data rates for GSM evolution (EDGE) system radio access network (GSM EDGE Radio Access Network, GERAN) architecture. In the UTRAN architecture or the GERAN architecture, a function of an MME is completed by a serving general packet radio service (GPRS) support node (SGSN), and a function of an SGW/a PGW is completed by a gateway GPRS support node (GGSN). The technical solutions in the embodiments of this application may alternatively be used for another communication system, for example, a public land mobile network (PLMN) system, a 5G communication system, or another system that may appear in the future. The following explains some terms in this application, to help a person skilled in the art have a better understanding. It should be noted that when solutions in the embodiments of this application are applied to the 5G system or the another system that may emerge in the future, names of a network device and a terminal device may change, but this does not affect implementation of the solutions in the embodiments of this application.

Figure 1:
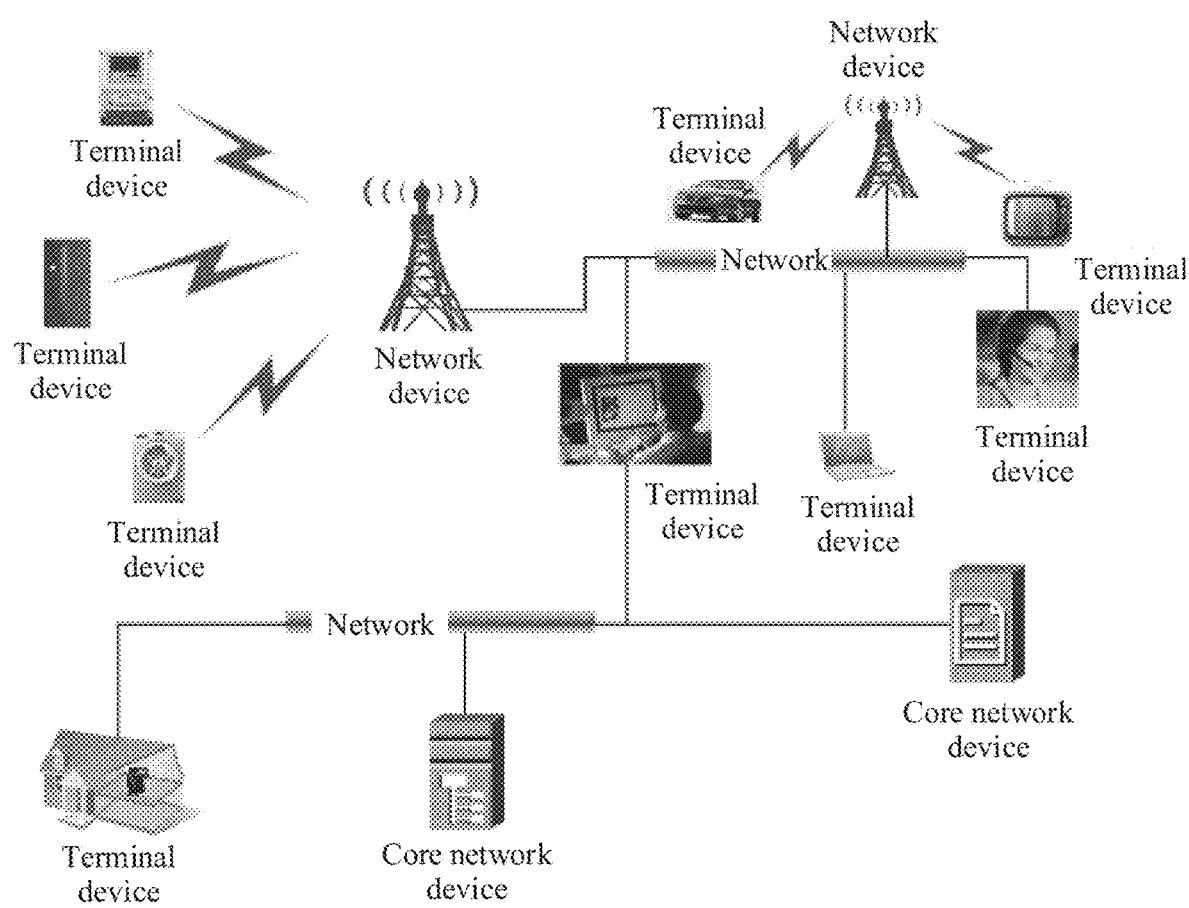
FIG. 1 is a schematic diagram of an application scenario according to an embodiment of this application.

FIG. 1 is a schematic diagram of an application scenario according to an embodiment of this application. The communication system may include a core network device, a network device, and at least one terminal device. For example, as shown in FIG. 1, A plurality of terminal devices share one paging subframe (Paging Occasion, PO) and a WUS before the PO. Therefore, provided that any terminal device belonging to the PO needs to be paged, another terminal device that is not paged also detects the WUS before the PO. To prevent a terminal device that is not paged from also detecting the WUS before the PO, a network device configures a plurality of wake up signals, where a configuration of the plurality of wake up signals includes a mapping relationship between group information and a wake up signal, and sends the configuration of the plurality of wake up signals to a terminal device, so that the terminal device may calculate, based on an identifier of the terminal device, a group to which the terminal device belongs, and then determine, based on the group and the mapping relationship, a wake up signal that needs to be monitored, so as to monitor the wake up signal, without a need to monitor a wake up signal corresponding to another group. In this way, when a terminal in a group needs to be paged, only a terminal device in the group detects the WUS before the PO, and a terminal device in another group does not detect the WUS before the PO, and therefore is not woken up. However, in this manner, only theoretically a quantity of woken-up terminal devices is decreased and a false alarm probability of paging is reduced, but another factor that affects wake-up of a terminal device is not considered.

(1) A terminal device, also referred to as a terminal or user equipment, is a device that provides a user with voice and/or data connectivity, for example, a handheld device or a vehicle-mounted device having a wireless connection function. Common terminal devices include, for example, a mobile phone, a tablet, a notebook computer, a palmtop computer, a mobile internet device (MID), and a wearable device. The wearable device includes, for example, a smartwatch, a smart band, or a pedometer.

(2) A network device, also referred to as a radio access network (RAN) device, is a device that enables a terminal device to access a wireless network, and includes network devices in various communication standards, for example, includes but is not limited to a base station, an evolved NodeB (eNB), a radio network controller (RNC), a NodeB (NB), a network device controller (BSC), a network device transceiver station (BTS), a home network device (for example, Home evolved NodeB, or Home NodeB, HNB), and a baseband unit (BBU).

The network device includes network devices of various frequency standards, for example, including but not limited to a low-frequency network device and a high-frequency network device.

(3) A core network device is a device that is responsible for mobility management of a terminal, and includes core network devices in various communication standards, for example, including but not limited to a mobility management entity (MME) in a 4G network and an access management function (AMF) entity in a 5G network. The core network device may be a physical entity, a logical functional entity, or a chip disposed in a physical entity.

(4) "A plurality of" indicates two or more, and another quantifier is similar to this. The term "and/or" describes an association relationship for describing associated objects and represents that three relationships may exist. For example, A and/or B may represent the following three cases: Only A exists, both A and B exist, and only B exists. The character "/" usually indicates an "or" relationship between the associated objects.

To resolve a problem, existing in a current technology, that power consumption of a terminal device that is not paged is relatively high because a false alarm probability of paging is relatively large, an embodiment of this application provides a wake up signal sending method. A terminal device receives, from a core network device, a first category to which the terminal device belongs, where different categories correspond to different service features; and receives a configuration of a plurality of wake up signals from a network device. In this way, after the first category and the configuration of the plurality of wake up signals are separately received, a to-be-monitored wake up signal may be determined in the plurality of wake up signals based on the first category, and the to-be-monitored wake up signal may be monitored. Therefore, it can be learned that, compared with the current technology, according to the wake up signal sending method provided in this embodiment of this application, a group to which the terminal device belongs is not simply determined based on an identifier of the terminal device, but a service feature of the terminal device is considered, for example, the uplink/downlink service trigger type of the terminal device or the probability that the terminal device is paged, the first category to which the terminal device belongs is determined based on the service feature of the terminal device, and then the to-be-monitored wake up signal is determined in the plurality of wake up signals based on the first category corresponding to the service feature. In this way, when any terminal device in the first category is paged, only a terminal device that has a same uplink/downlink service trigger type or has a same or similar probability of being paged is woken up, and another terminal device that is not paged is not woken up. This reduces a false alarm probability of paging, thereby reducing power consumption of a terminal device that is not paged.

In this embodiment of this application, the different categories correspond to the different service features. Service features of terminal devices corresponding to the first category are the same, that is, terminal devices belonging to a first category have a same service feature. This is understood as that terminal devices belonging to a first type have a same service feature. It may be understood that, herein the same service feature cannot be understood, in a limited manner, as that the service features are absolutely the same, and may alternatively be understood as the service features are similar. For example, when the terminal device is a mobile phone or a computer, and both the mobile phone and the computer correspond to downlink service trigger, it may be considered that the mobile phone and the computer have a same service feature. When the terminal device is a water meter or a smoke alarm, the water meter and the smoke alarm almost do not involve downlink service trigger, and have a relatively low probability of being paged, it may be considered that the water meter and the smoke alarm have similar service features. It should be noted that when it is determined, by using probability values of being paged, whether two terminal devices have a same service feature, if the two terminal devices have an equal probability value of being paged, it may be considered that the two terminal devices have a same service feature. Alternatively, if the two terminal devices have probability values of being paged that are not equal, but a difference between the probability values of being paged is less than a preset threshold, it may also be considered that the two terminal devices have a same service feature. The preset threshold may be set based on an actual requirement. Herein, a value of the preset threshold is not specifically limited in the embodiments of this application.

It should be noted that, in this embodiment of this application, when the to-be-monitored wake up signal that the terminal device needs to monitor is determined based on the service feature, at least two possible implementations below may be used for determining. In a possible implementation, the first category to which the terminal device belongs may be first determined based on the service feature, and then the to-be-monitored wake up signal that the terminal device needs to monitor is determined based on the first category and a mapping relationship between category information and a wake up signal. In a second possible implementation, the to-be-monitored wake up signal that the terminal device needs to monitor may be determined with reference to the service feature and a grouping factor (for example, the identifier of the terminal device). In other words, the first category to which the terminal device belongs may be first determined based on the service feature, and then the to-be-monitored wake up signal that the terminal device needs to monitor is determined based on both the first category and the grouping factor. The following describes in detail, by using detailed embodiments, wake up signal sending methods that each include the two possible implementations.

Figure 2:
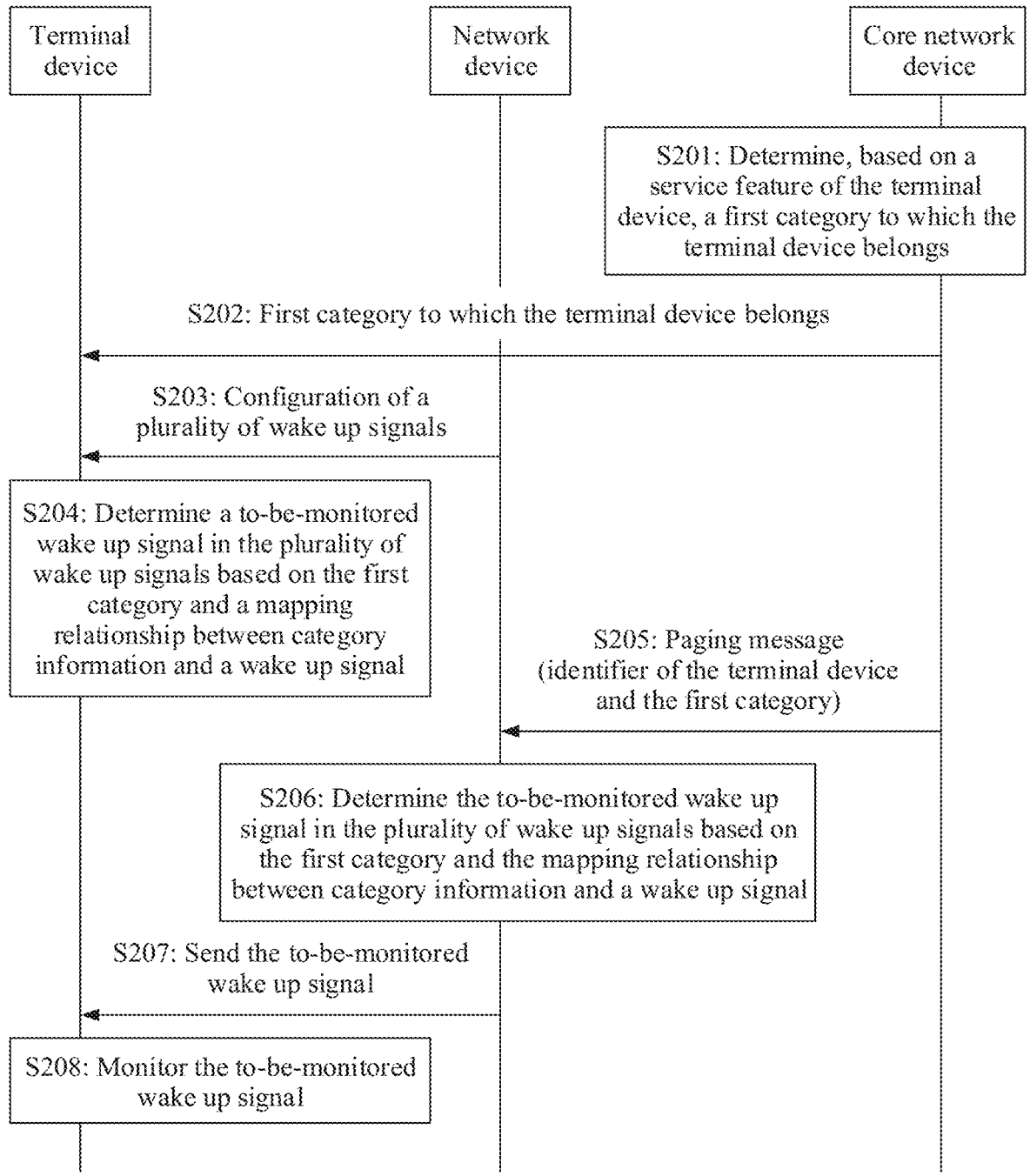
FIG. 2 is a schematic diagram of a wake up signal sending method according to an embodiment of this application.

In a possible implementation, for example, FIG. 2 is a schematic diagram of a wake up signal sending method according to an embodiment of this application. The wake up signal sending method may include the following steps.

S201: A core network device determines, based on a service feature of a terminal device, a first category to which a terminal device belongs.

Terminal devices belonging to the first category have a same service feature, so as to classify terminal devices based on service features, and obtain a category to which each terminal device belongs. Optionally, the service feature includes at least one of a probability that the terminal device is paged, or an uplink/downlink service trigger type. The probability that the terminal device is paged is determined based on a quantity of communication times of the terminal device per unit time. If the quantity of communication times is less than a preset threshold, it may be determined that the terminal device is of the uplink service trigger type. On the contrary, if the quantity of communication times is greater than or equal to the preset threshold, it may be determined that the terminal device is of the downlink service trigger type. For example, when the category to which the terminal device belongs is determined based on the service feature of the terminal device, the service feature may be used to indicate a probability that the terminal device is paged, and probabilities that terminal devices having different service features are paged are different. In this way, based on the service feature, terminal devices with a relatively high probability of being paged are put into a same category, and terminal devices with a relatively low probability of being paged are put into a same group.

For example, when the terminal device is a water meter, a main service of the terminal device is monitoring water consumption data, and reporting the water consumption data. In other words, almost all service features of the water meter are uplink trigger, and a probability that the water meter is paged for downlink transmission is relatively low. When the terminal device is a smoke alarm, a main service of the terminal device is reporting smoke data after smoke is detected. In other words, almost all service features of the smoke alarm are uplink trigger, and a probability that the smoke alarm is paged for downlink transmission is relatively low. It can be learned that the water meter and the smoke alarm have a same service feature. Therefore, the water meter and the smoke alarm may be put into a same category based on the service feature of the water meter and the service feature of the smoke alarm, and a probability that a terminal device in the category is paged is relatively low. On the contrary, when the terminal device is a mobile phone or a computer, a service feature of the terminal device includes uplink trigger and downlink paging, that is, a probability of being paged is relatively high. It can be learned that the mobile phone and the computer have the same service feature. Therefore, the mobile phone and the computer may be put into one category based on the service feature of the mobile phone and the service feature of the computer, and a probability that a terminal device in the category is paged is relatively high. In this way, a mobile phone and a notebook computer that have a relatively high probability of being paged are put into a same category, and a water meter and a smoke alarm that have a relatively low probability of being paged are put into a same group.

It should be noted that, in this embodiment of this application, before S201 of determining, based on a service feature of a terminal device, a first category to which the terminal device belongs is performed, the service feature sent by the terminal device may be first received, and then the first category to which the terminal device belongs is determined based on the received service feature of the terminal device. Certainly, registration information of the terminal device that is stored on a core network side includes the service feature of the terminal device. Therefore, alternatively, the service feature sent by the terminal device may not need to be first received, but the first category to which the terminal device belongs is directly determined based on the service feature of the terminal device that is included in the registration information of the terminal device. When the core network device receives the service feature sent by the terminal device, the terminal device may first send the service feature of the terminal device to a network device, and then send the service feature of the terminal device to the core network device through the network device, so that the core network device receives the service feature of the terminal device. In a transmission process of the service feature, the service feature may be transmitted through non-access stratum (NAS) signaling, and the network device only plays a role of transparent transmission.

After the first category to which the terminal device belongs is determined based on the service feature of the terminal device in S201, the following S202 may be performed:

S202: The core network device sends the first category to which the terminal device belongs to the terminal device.

The first category may include a plurality of different representation manners. Manner 1: The first category may be a specific probability value. Manner 2: The first category may be qualitative information indicating a probability value, for example, a high probability, a medium probability, or a low probability. Manner 3: The first category may alternatively be uplink service trigger or downlink service trigger. Although the uplink service trigger and the downlink service trigger do not explicitly reflect a probability that the terminal device is paged, the uplink service trigger and the downlink service trigger may indirectly reflect the probability that the terminal device is paged. Generally, the uplink service trigger may be understood as that a probability of being paged is low, and the downlink service trigger may be understood as that a probability of being paged is medium or high. Manner 4: The first category may alternatively be directly a category identifier of the first category. Certainly, the four representation manners are merely used as an example for description in this embodiment of this application, but this does not mean that this embodiment of this application is limited thereto.

After determining, based on the service feature of the terminal device, the first category to which the terminal device belongs, the core network device may send the first category to which the terminal device belongs to the terminal device, so that the terminal device obtains the first category to which the terminal device belongs. It should be noted that, when sending the first category to which the terminal device belongs to the terminal device, the network device may first send the first category to which the terminal device belongs to the network device, and then send the first category to which the terminal device belongs to the terminal device through the network device, so that the terminal device obtains the first category to which the terminal device belongs. Similarly, in a transmission process of the first category to which the terminal device belongs, the first category to which the terminal device belongs may be transmitted through NAS signaling, and the network device only plays a role of transparent transmission.

It should be noted that, the two steps of S201 in which the core network device determines, based on the service feature of the terminal device, the first category to which the terminal device belongs and S202 in which the core network device sends the first category to which the terminal device belongs to the terminal device may be understood as a process in which the terminal device and the core network device negotiate to classify terminal devices based on service features to determine a category to which a terminal device belongs. The negotiation process is transparent to the network device, that is, the network device cannot obtain content of the negotiation process.

S203: The network device sends a configuration of a plurality of wake up signals to the terminal device.

The configuration of the plurality of wake up signals includes a mapping relationship between category information and a wake up signal. One piece of category information may correspond to one wake up signal, or may correspond to a plurality of wake up signals. Certainly, the network device supports a configuration manner in which classification is performed by using category information.

When sending the configuration of the plurality of wake up signals to the terminal device, the network device may broadcast the configuration of the plurality of wake up signals to terminal devices in a cell in a broadcast manner, so that the terminal devices in the cell can obtain the configuration of the plurality of wake up signals.

After respectively obtaining the first category to which the terminal device belongs and the configuration of the plurality of wake up signals through S202 and S203, the terminal device may determine, based on the first category and the mapping relationship that is between category information and a wake up signal and that is included in the configuration of the plurality of wake up signals, a to-be-monitored wake up signal in the plurality of wake up signals, that is, perform the following S204:

S204: The terminal device determines the to-be-monitored wake up signal in the plurality of wake up signals based on the first category and the mapping relationship between category information and a wake up signal.

There may be one or more to-be-monitored wake up signals, and a quantity of the to-be-monitored wake up signals is less than a quantity of the plurality of wake up signals.

After separately obtaining the first category to which the terminal device belongs and the configuration of the plurality of wake up signals, the terminal device may search for a wake up signal corresponding to the first category, based on the first category and the mapping relationship between category information and a wake up signal. The wake up signal corresponding to the first category is the to-be-monitored wake up signal that the terminal device needs to monitor. In this way, the to-be-monitored wake up signal is determined.

For example, the quantity of the plurality of wake up signals is 8. The eight wake up signals are a wake up signal 1, a wake up signal 2, a wake up signal 3, a wake up signal 4, a wake up signal 5, a wake up signal 6, a wake up signal 7, and a wake up signal 8. A configuration of the eight wake up signals includes a mapping relationship between category information and a wake up signal. Reference may be made to the following Table 1:

TABLE 1

| Category information | Wake up signal |
|---|---|
| Uplink service trigger | Wake up signal 1 |
| | Wake up signal 2 |
| | Wake up signal 3 |
| | Wake up signal 4 |
| Downlink service trigger | Wake up signal 5 |
| | Wake up signal 6 |
| | Wake up signal 7 |
| | Wake up signal 8 |

With reference to Table 1, it can be learned that, in the configuration of the plurality of wake up signals, the category information classified based on service feature information includes two categories, namely, the uplink service trigger and the downlink service trigger. The uplink service trigger corresponds to the wake up signal 1, the wake up signal 2, the wake up signal 3, and the wake up signal 4, and the downlink service trigger corresponds to the wake up signal 5, the wake up signal 6, the wake up signal 7, and the wake up signal 8. In this way, if the first category to which the terminal device belongs is the category of the uplink service trigger, it indicates that the terminal device needs to monitor the wake up signal 1, the wake up signal 2, the wake up signal 3, and the wake up signal 4. The wake up signal 1, the wake up signal 2, the wake up signal 3, and the wake up signal 4 are to-be-monitored wake up signals that the terminal device needs to monitor, and the terminal device does not need to monitor the wake up signal 5, the wake up signal 6, the wake up signal 7, and the wake up signal 8. If the first category to which the terminal device belongs is the category of the downlink service trigger, it indicates that the terminal device needs to monitor the wake up signal 5, the wake up signal 6, the wake up signal 7, and the wake up signal 8. The wake up signal 5, the wake up signal 6, the wake up signal 7, and the wake up signal 8 are to-be-monitored wake up signals that the terminal device needs to monitor, and the terminal device does not need to monitor the wake up signal 1, the wake up signal 2, the wake up signal 3, and the wake up signal 4. In this way, the to-be-monitored wake up signal that the terminal device needs to monitor is determined based on the category to which the terminal device belongs.

It should be noted that, in the foregoing Table 1, that the category information includes the two categories of the uplink service trigger and the downlink service trigger is merely used as an example for description. Certainly, the category information may alternatively include another representation manner, for example, a high probability, a medium probability, or a low probability.

S205: The core network device sends a paging message to the network device.

The paging message includes an identifier of the terminal device and the first category. For example, the identifier of the terminal device may be a device number when the terminal device is delivered from a factory, or may be a device identifier allocated by the core network device to the terminal device, provided that the identifier can uniquely identify the terminal device. Herein, the identifier of the terminal device is not further limited in this embodiment of this application.

When determining to page a terminal device, the core network device may send a paging message to the network device, where the paging message may include an identifier of the terminal device and a category to which the terminal device belongs, so that the network device performs the following S206 after receiving the paging message:

S206: The network device determines the to-be-monitored wake up signal in the plurality of wake up signals based on the first category and the mapping relationship between category information and a wake up signal.

The network device pre-configures the plurality of wake up signals, and the configuration of the plurality of wake up signals includes the mapping relationship between category information and a wake up signal. Therefore, after receiving the paging message including the first category to which the terminal device belongs, the network device may search for the wake up signal corresponding to the first category, based on the first category and the mapping relationship between category information and a wake up signal. The wake up signal corresponding to the first category is the wake up signal that needs to wake up the terminal device. This wake up signal and the to-be-monitored wake up signal that is determined by the terminal device in the plurality of wake up signals based on the first category in S204 are a same wake up signal. In this way, the terminal device is woken up by using this wake up signal, thereby implementing paging of the terminal device.

It should be noted that, for the network device, when determining the to-be-monitored wake up signal in the plurality of wake up signals based on the first category and the mapping relationship between category information and a wake up signal, for a specific process thereof, refer to the descriptions of determining the to-be-monitored wake up signal by the terminal device based on the first category in S204. Details are not described herein again in this embodiment of this application.

In addition, it should be further noted that, because a process of classifying terminal devices based on service features is negotiated by the terminal device and the core network device, and is transparent to the network device, when the network device does not support classifying terminal devices based on service features, both the terminal device and the network device may determine the to-be-monitored signal in a fallback mechanism. In other words, reference may be made to a method in a current technology, to perform a modulo-N operation on identifiers of terminal devices, divide the terminal devices into groups based on remainders obtained after the modulo-N operation, and then determine the wake up signal that needs to wake up the terminal device, namely, a to-wake-up signal, based on a relationship between a group and a wake up signal. Alternatively, when the network device supports classifying terminal devices based on service features, but the configured mapping relationship between category information and a wake up signal does not include the first category (for example, the first category of the terminal device is the medium probability, but the network device configures wake up signals only for two categories: the high probability and the low probability), the terminal device needs to determine, in a fallback mechanism, the to-be-monitored signal based on the first category and a category that is actually configured by the network device. In this case, the fallback mechanism may be falling back to determining the wake up signal by using only the identifier of the terminal device in the foregoing descriptions, or falling back in a fixed category direction, namely, in a configured sequence, by the terminal device and the network device by using an agreed-on method. For example, if the network device configures the high probability and the low probability, but first category information of the terminal device is the medium probability, the first category information falls back to the high probability or the low probability, and a wake up signal corresponding to the high probability or the low probability is determined as the wake up signal that needs to wake up the terminal device, namely, the to-wake-up signal.

After determining the to-be-monitored wake up signal in the plurality of wake up signals based on the first category and the mapping relationship between category information and a wake up signal, the network device may send the to-be-monitored wake up signal to the terminal device, that is, perform the following S207:

S207: The network device sends the to-be-monitored wake up signal to the terminal device based on the identifier of the terminal device.

Because the paging message received by the network device includes the identifier of the paged terminal device, after determining the to-be-monitored wake up signal in the plurality of wake up signals based on the first category and the mapping relationship between category information and a wake up signal, the network device may determine the paged terminal device based on the identifier of the terminal device, and send the to-be-monitored wake up signal to the terminal device, to wake up the terminal device by using the to-be-monitored wake up signal.

S208: The terminal device monitors the to-be-monitored wake up signal.

After determining, in S204, the to-be-monitored wake up signal that needs to be monitored, the terminal device monitors the to-be-monitored wake up signal based on a configuration of the to-be-monitored wake up signal. Therefore, it can be learned that, compared with the current technology, according to the wake up signal sending method provided in this embodiment of this application, a group to which the terminal device belongs is not simply determined based on the identifier of the terminal device, but the service feature of the terminal device is considered, for example, the uplink/downlink service trigger type of the terminal device or the probability that the terminal device is paged, the first category to which the terminal device belongs is determined based on the service feature of the terminal device, and then the to-be-monitored wake up signal is determined in the plurality of wake up signals based on the first category corresponding to the service feature. In this way, when any terminal device in the first category is paged, only a terminal device that has a same uplink/downlink service trigger type or has a same or similar probability of being paged is woken up, and another terminal device that is not paged is not woken up. This reduces a false alarm probability of paging, thereby reducing power consumption of a terminal device that is not paged.

It should be noted that, after the to-be-monitored wake up signal is detected based on the configuration of the to-be-monitored wake up signal, if the to-be-monitored wake up signal indicates that the terminal device is to be paged, a physical downlink control channel is monitored in a paging subframe corresponding to the to-be-monitored wake up signal; or if the to-be-monitored wake up signal indicates that the terminal device is not to be paged, a physical downlink control channel is not monitored in a paging subframe corresponding to the to-be-monitored wake up signal, in other words, the terminal device may continue to maintain a current sleep state or power saving state.

In this possible implementation, for example, the terminal device includes a water meter, a smoke alarm, a mobile phone, and a computer. The core network device may determine, based on service features of the water meter and the smoke alarm, that a category to which the water meter and the smoke alarm belong is the category of uplink service trigger, and determine, based on service features of the mobile phone and the computer, that a category to which the mobile phone and the computer belong is the category of the downlink service trigger. In addition, after separately determining the categories to which the water meter, the smoke alarm, the mobile phone, and the computer respectively belong, the core network device sends the categories to which the water meter, the smoke alarm, the mobile phone, and the computer respectively belong to the corresponding water meter, smoke alarm, mobile phone, and computer. In addition, the water meter, the smoke alarm, the mobile phone, and the computer all receive a configuration of a plurality of wake up signals sent by the network device. For the configuration of the plurality of wake up signals, refer to the foregoing Table 1. Wake up signals corresponding to the category of the uplink service trigger are a wake up signal 1, a wake up signal 2, a wake up signal 3, and a wake up signal 4, and wake up signals corresponding to the category of the downlink service trigger are a wake up signal 5, a wake up signal 6, a wake up signal 7, and a wake up signal 8, so that the water meter and the smoke alarm may determine, based on the category of the uplink service trigger to which the water meter and the smoke alarm belong, that to-be-monitored signals that the water meter and the smoke alarm need to monitor are the wake up signal 1, the wake up signal 2, the wake up signal 3, and the wake up signal 4, and monitor the wake up signal 1, the wake up signal 2, the wake up signal 3, and the wake up signal 4; similarly, the mobile phone and the computer may determine, based on the category of the uplink service trigger to which the mobile phone and the computer belong, that to-be-monitored signals that the mobile phone and the computer need to monitor are the wake up signal 5, the wake up signal 6, the wake up signal 7, and the wake up signal 8, and monitor the wake up signal 5, the wake up signal 6, the wake up signal 7, and the wake up signal 8. In this way, when the core network device pages the mobile phone by using the wake up signal 5, the wake up signal 6, the wake up signal 7, and the wake up signal 8, for the water meter, the smoke alarm, the mobile phone, and the computer that are monitoring the wake up signals, only the mobile phone and a notebook computer can detect the wake up signal 5, the wake up signal 6, the wake up signal 7, and the wake up signal 8, and are woken up by the wake up signals, and neither the water meter nor the smoke alarm detects the wake up signal 5, the wake up signal 6, the wake up signal 7, and the wake up signal 8, and is woken up. This reduces false alarm probabilities of paging of a watch and the smoke alarm, thereby reducing power consumption of the watch and the smoke alarm that are not paged.

The embodiment shown in FIG. 2 describes in detail that, in a wake up signal sending process, when the to-be-monitored signal is determined, in a possible implementation, the first category to which the terminal device belongs may be first determined based on the service feature, and then the to-be-monitored wake up signal that the terminal device needs to monitor is determined based on the first category and the mapping relationship between category information and a wake up signal. The following provides detailed descriptions in which in another possible implementation, the to-be-monitored wake up signal that the terminal device needs to monitor may be determined with reference to both the service feature and the grouping factor (for example, the identifier of the terminal device). In other words, the first category to which the terminal device belongs may be first determined based on the service feature, and then, the to-be-monitored wake up signal that the terminal device needs to monitor is determined based on both the first category and the grouping factor.

Figure 3:
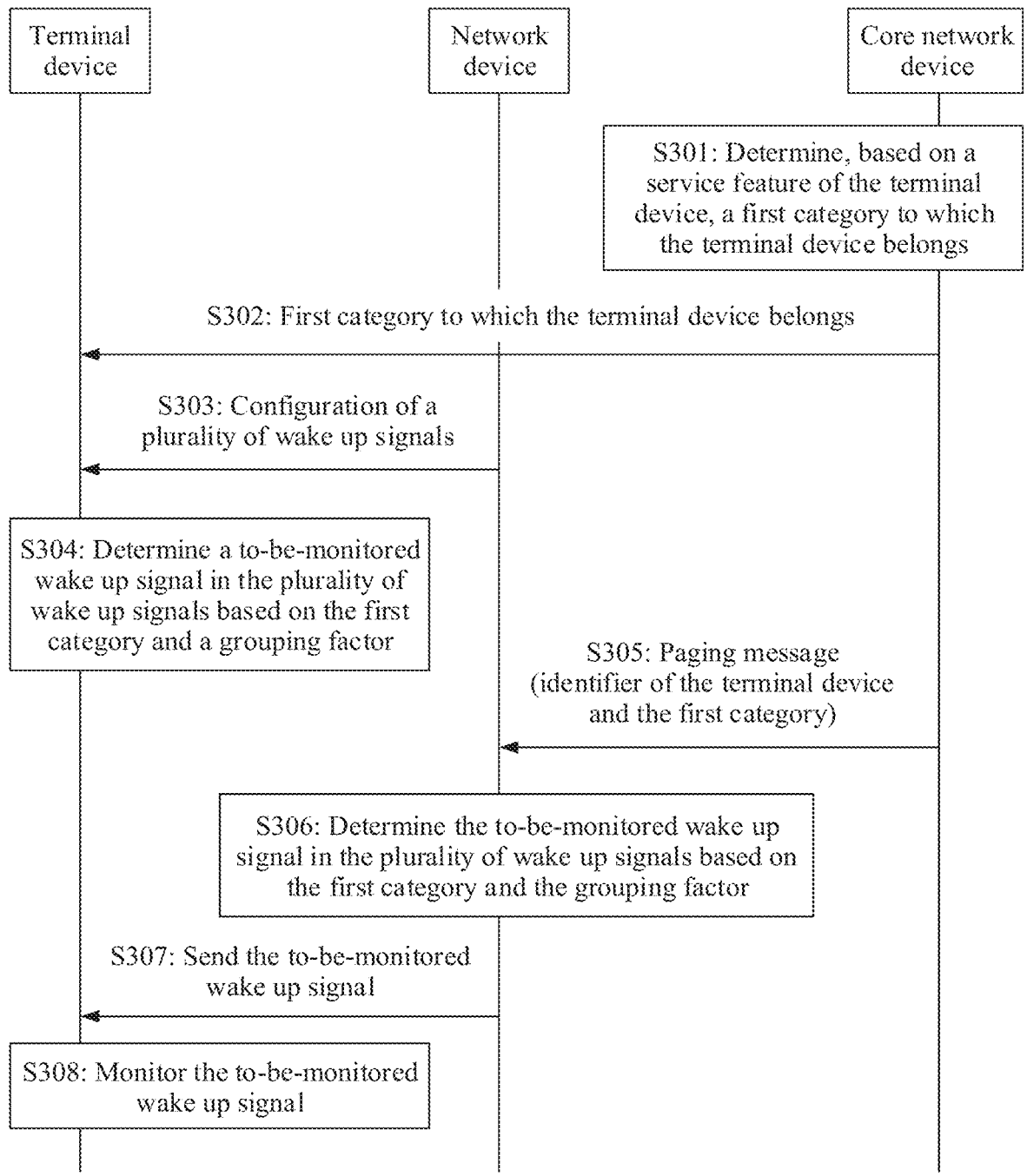
FIG. 3 is a schematic diagram of another wake up signal sending method according to an embodiment of this application.

In another possible implementation, for example, FIG. 3 is a schematic diagram of another wake up signal sending method according to an embodiment of this application. The wake up signal sending method may include the following steps.

S301: A core network device determines, based on a service feature of a terminal device, a first category to which a terminal device belongs.

S302: The core network device sends the first category to which the terminal device belongs to the terminal device.

S303: The network device sends a configuration of a plurality of wake up signals to the terminal device.

The configuration of the plurality of wake up signals includes a mapping relationship between category information and a wake up signal.

It should be noted that, in the embodiment shown in FIG. 3, the descriptions in S301 to S303 are similar to the descriptions in S201 to S203 in the embodiment shown in FIG. 2. Therefore, for the descriptions in S301 to S303, refer to related descriptions in S201 to S203. Details are not described herein again in this embodiment of this application.

After respectively obtaining the first category to which the terminal device belongs and the configuration of the plurality of wake up signals through S302 and S303, the terminal device may determine, based on the first category and the mapping relationship that is between category information and a wake up signal and that is included in the configuration of the plurality of wake up signals, the to-be-monitored wake up signal in the plurality of wake up signals, that is, perform the following S304:

S304: The terminal device determines the to-be-monitored wake up signal in the plurality of wake up signals based on the first category and a grouping factor.

The grouping factor may be an identifier of the terminal device. A modulo-N operation may be performed on identifiers of terminal devices, to divide the terminal devices into different groups based on remainders obtained after the modulo-N operation. For example, N may be 2 or 4, or certainly, may be 8. Specifically, N may be set based on an actual requirement. Herein, a value of N is not further limited in this embodiment of this application. There may be one or more to-be-monitored wake up signals, and a quantity of the to-be-monitored wake up signals is less than a quantity of the plurality of wake up signals.

Optionally, in this embodiment of this application, when the to-be-monitored wake up signal is determined in the plurality of wake up signals based on the first category and the grouping factor, the to-be-monitored wake up signal may be determined in the plurality of wake up signals by using the following two methods. The two methods are as follows:

Method 1: First, a plurality of to-be-determined wake up signals may be determined in the plurality of wake up signals based on the first category. Then, the to-be-monitored wake up signal is determined in the plurality of to-be-determined wake up signals based on the grouping factor.

Method 2: First, a plurality of to-be-determined wake up signals may be determined in the plurality of wake up signals based on the grouping factor. Then, the to-be-monitored wake up signal is determined in the plurality of to-be-determined wake up signals based on the first category.

For example, the quantity of the plurality of wake up signals is 8, and a modulo-4 operation is performed on the identifier of the terminal device. The eight wake up signals are a wake up signal 1, a wake up signal 2, a wake up signal 3, a wake up signal 4, a wake up signal 5, a wake up signal 6, a wake up signal 7, and a wake up signal 8. A configuration of the eight wake up signals includes a mapping relationship between category information and a wake up signal. A group 1 is a group in which a remainder obtained after the modulo-4 operation is performed on the identifier of the terminal device is 0. A group 2 is a group in which a remainder obtained after the modulo-4 operation is performed on the identifier of the terminal device is 1. A group 3 is a group in which a remainder obtained after the modulo-4 operation is performed on the identifier of the terminal device is 2. A group 3 is a group in which a remainder obtained after the modulo-4 operation is performed on the identifier of the terminal device is 3. When the to-be-monitored wake up signal is determined in the plurality of wake up signals based on the first category and the grouping factor, reference may be made to the following Table 2:

TABLE 2

| Category information | Group information | Wake up signal |
| --- | --- | --- |
| Uplink service trigger | Group 1 | Wake up signal 1 |
|  | Group 2 | Wake up signal 2 |
|  | Group 3 | Wake up signal 3 |
|  | Group 4 | Wake up signal 4 |
| Downlink service trigger | Group 1 | Wake up signal 5 |
|  | Group 2 | Wake up signal 6 |
|  | Group 3 | Wake up signal 7 |
|  | Group 4 | Wake up signal 8 |

With reference to Table 2, it can be learned that, in the configuration of plurality of wake up signals, the category information classified based on service feature information includes two categories, namely, the uplink service trigger and the downlink service trigger. The uplink service trigger corresponds to the wake up signal 1, the wake up signal 2, the wake up signal 3, and the wake up signal 4. The downlink service trigger corresponds to the wake up signal 5, the wake up signal 6, the wake up signal 7, and the wake up signal 8. When the to-be-monitored wake up signal is determined in the plurality of wake up signals based on the first category and the grouping factor, with reference to the foregoing method 1, if a first type to which the terminal device belongs is the category of the uplink service trigger, to-be-determined wake up signals may be first determined in the eight wake up signals based on the category of the uplink service trigger, where the to-be-determined wake up signals are the wake up signal 1, the wake up signal 2, the wake up signal 3, and the wake up signal 4; and then, the to-be-monitored wake up signal that the terminal device needs to monitor is further determined in the four to-be-determined wake up signals: the wake up signal 1, the wake up signal 2, the wake up signal 3, and the wake up signal 4, based on a remainder obtained after the modulo-4 operation is performed on the identifier of the terminal device. Specifically, if the remainder obtained after the modulo-4 operation is performed on the identifier of the terminal device is 0, it is determined, in the four to-be-determined wake up signals: the wake up signal 1, the wake up signal 2, the wake up signal 3, and the wake up signal 4 and based on the group 1, that the to-be-monitored wake up signal is the wake up signal 1. In other words, the terminal device needs to monitor only the wake up signal 1, and does not need to monitor the other seven wake up signals. If the remainder obtained after the modulo-4 operation is performed on the identifier of the terminal device is 1, it is determined, in the four to-be-determined wake up signals: the wake up signal 1, the wake up signal 2, the wake up signal 3, and the wake up signal 4 and based on the group 2, that the to-be-monitored wake up signal is the wake up signal 2. In other words, the terminal device needs to monitor only the wake up signal 2, and does not need to monitor the other seven wake up signals. If the remainder obtained after the modulo-4 operation is performed on the identifier of the terminal device is 2, it is determined, in the four to-be-determined wake up signals: the wake up signal 1, the wake up signal 2, the wake up signal 3, and the wake up signal 4 and based on the group 3, that the to-be-monitored wake up signal is the wake up signal 3. In other words, the terminal device needs to monitor only the wake up signal 3, and does not need to monitor the other seven wake up signals. Specifically, if the remainder obtained after the modulo-4 operation is performed on the identifier of the terminal device is 3, it is determined, in the four to-be-determined wake up signals: the wake up signal 1, the wake up signal 2, the wake up signal 3, and the wake up signal 4 and based on the group 4, that the to-be-monitored wake up signal is the wake up signal 4. In other words, the terminal device needs to monitor only the wake up signal 4, and does not need to monitor the other seven wake up signals. In this way, the to-be-monitored wake up signal is determined in the plurality of wake up signals based on the foregoing method 1. On the contrary, if a first type to which the terminal device belongs is the category of the downlink service trigger, to-be-determined wake up signals may be first determined in the eight wake up signals based on the category of the downlink service trigger, where the to-be-determined wake up signals are the wake up signal 5, the wake up signal 6, the wake up signal 7, and the wake up signal 8; and then, the to-be-monitored wake up signal that the terminal device needs to monitor is further determined in the four to-be-determined wake up signals: the wake up signal 5, the wake up signal 6, the wake up signal 7, and the wake up signal 8, based on a remainder obtained after the modulo-4 operation is performed on the identifier of the terminal device. Specifically, if the remainder obtained after the modulo-4 operation is performed on the identifier of the terminal device is 0, it is determined, in the four to-be-determined wake up signals: the wake up signal 5, the wake up signal 6, the wake up signal 7, and the wake up signal 8 and based on the group 1, that the to-be-monitored wake up signal is the wake up signal 5. In other words, the terminal device needs to monitor only the wake up signal 5, and does not need to monitor the other seven wake up signals. If the remainder obtained after the modulo-4 operation is performed on the identifier of the terminal device is 1, it is determined, in the four to-be-determined wake up signals: the wake up signal 5, the wake up signal 6, the wake up signal 7, and the wake up signal 8 and based on the group 2, that the to-be-monitored wake up signal is the wake up signal 6. In other words, the terminal device needs to monitor only the wake up signal 6, and does not need to monitor the other seven wake up signals. If the remainder obtained after the modulo-4 operation is performed on the identifier of the terminal device is 2, it is determined, in the four to-be-determined wake up signals: the wake up signal 5, the wake up signal 6, the wake up signal 7, and the wake up signal 8 and based on the group 3, that the to-be-monitored wake up signal is the wake up signal 7. In other words, the terminal device needs to monitor only the wake up signal 7, and does not need to monitor the other seven wake up signals. Specifically, if the remainder obtained after the modulo-4 operation is performed on the identifier of the terminal device is 3, it is determined, in the four to-be-determined wake up signals: the wake up signal 5, the wake up signal 6, the wake up signal 7, and the wake up signal 8 and based on the group 4, that the to-be-monitored wake up signal is the wake up signal 8. In other words, the terminal device needs to monitor only the wake up signal 8, and does not need to monitor the other seven wake up signals. In this way, the to-be-monitored wake up signal is determined in the plurality of wake up signals based on the foregoing method 1.

With reference to the foregoing Table 2, in the foregoing method 2, the to-be-determined wake up signals may be first determined in the eight wake up signals based on the remainder obtained after the modulo-4 operation is performed on the identifier of the terminal device. If the remainder obtained after the modulo-4 operation is performed on the identifier of the terminal device is 0, it may be determined, in the eight wake up signals and based on the group 1, that the to-be-determined wake up signals are the wake up signal 1 and the wake up signal 5, and the to-be-monitored wake up signal is further determined in the wake up signal 1 and the wake up signal 5 based on the first type to which the terminal device belongs. If the first category to which the terminal device belongs is the category of the uplink service trigger, it may be determined, in the wake up signal 1 and the wake up signal 5 and based on the category of the uplink service trigger, that the to-be-monitored wake up signal is the wake up signal 1. In other words, the terminal device needs to monitor only the wake up signal 1, and does not need to monitor the other seven wake up signals. If the first category to which the terminal device belongs is the category of the downlink service trigger, it may be determined, in the wake up signal 1 and the wake up signal 5 and based on the category of the uplink service trigger, that the to-be-monitored wake up signal is the wake up signal 5. In other words, the terminal device needs to monitor only the wake up signal 5, and does not need to monitor the other seven wake up signals. In this way, the to-be-monitored wake up signal is determined in the plurality of wake up signals based on the foregoing method 2. If the remainder obtained after the modulo-4 operation is performed on the identifier of the terminal device is 1, it may be determined, in the eight wake up signals and based on the group 2, that the to-be-determined wake up signals are the wake up signal 2 and the wake up signal 6, and the to-be-monitored wake up signal is further determined in the wake up signal 2 and the wake up signal 6 based on the first type to which the terminal device belongs. If the first category to which the terminal device belongs is the category of the uplink service trigger, it may be determined, in the wake up signal 2 and the wake up signal 6 and based on the category of the uplink service trigger, that the to-be-monitored wake up signal is the wake up signal 2. In other words, the terminal device needs to monitor only the wake up signal 2, and does not need to monitor the other seven wake up signals. If the first category to which the terminal device belongs is the category of the downlink service trigger, it may be determined, in the wake up signal 2 and the wake up signal 6 and based on the category of the uplink service trigger, that the to-be-monitored wake up signal is the wake up signal 6. In other words, the terminal device needs to monitor only the wake up signal 6, and does not need to monitor the other seven wake up signals. In this way, the to-be-monitored wake up signal is determined in the plurality of wake up signals based on the foregoing method 2. If the remainder obtained after the modulo-4 operation is performed on the identifier of the terminal device is 2, it may be determined, in the eight wake up signals and based on the group 3, that the to-be-determined wake up signals are the wake up signal 3 and the wake up signal 7, and then the to-be-monitored wake up signal is further determined in the wake up signal 3 and the wake up signal 7 based on the first type to which the terminal device belongs. If the first category to which the terminal device belongs is the category of the uplink service trigger, it may be determined, in the wake up signal 3 and the wake up signal 7 and based on the category of the uplink service trigger, that the to-be-monitored wake up signal is the wake up signal 3. In other words, the terminal device needs to monitor only the wake up signal 3, and does not need to monitor the other seven wake up signals. If the first category to which the terminal device belongs is the category of the downlink service trigger, it may be determined, in the wake up signal 3 and the wake up signal 7 and based on the category of the uplink service trigger, that the to-be-monitored wake up signal is the wake up signal 7. In other words, the terminal device needs to monitor only the wake up signal 7, and does not need to monitor the other seven wake up signals. In this way, the to-be-monitored wake up signal is determined in the plurality of wake up signals based on the foregoing method 2. If the remainder obtained after the modulo-4 operation is performed on the identifier of the terminal device is 3, it may be determined, in the eight wake up signals and based on the group 4, that the to-be-determined wake up signals are the wake up signal 4 and the wake up signal 8, and the to-be-monitored wake up signal is further determined in the wake up signal 4 and the wake up signal 8 based on the first type to which the terminal device belongs. If the first category to which the terminal device belongs is the category of the uplink service trigger, it may be determined, in the wake up signal 4 and the wake up signal 8 and based on the category of the uplink service trigger, that the to-be-monitored wake up signal is the wake up signal 4. In other words, the terminal device needs to monitor only the wake up signal 4, and does not need to monitor the other seven wake up signals. If the first category to which the terminal device belongs is the category of the downlink service trigger, it may be determined, in the wake up signal 4 and the wake up signal 8 and based on the category of the uplink service trigger, that the to-be-monitored wake up signal is the wake up signal 8. In other words, the terminal device needs to monitor only the wake up signal 8, and does not need to monitor the other seven wake up signals. In this way, the to-be-monitored wake up signal is determined in the plurality of wake up signals based on the foregoing method 2.

It should be noted that, in the foregoing Table 2, that the category information includes the two categories of the uplink service trigger and the downlink service trigger is merely used as an example for description similarly. Certainly, the category information may alternatively include another representation manner, for example, a high probability, a medium probability, or a low probability.

S305: The core network device sends a paging message to the network device.

The paging message includes an identifier of the terminal device and the first category. For example, the identifier of the terminal device may be a device number when the terminal device is delivered from a factory, or may be a device identifier allocated by the core network device to the terminal device, provided that the identifier can uniquely identify the terminal device. The identifier of the terminal device is not further limited in this embodiment of this application.

When determining to page a terminal device, the core network device may send a paging message to the network device, where the paging message may include an identifier of the terminal device and a category to which the terminal device belongs, so that the network device performs the following S306 after receiving the paging message:

S306: The network device determines the to-be-monitored wake up signal in the plurality of wake up signals based on the first category and the grouping factor.

The network device pre-configures the plurality of wake up signals, and the configuration of the plurality of wake up signals includes the mapping relationship between category information and a wake up signal. Therefore, after receiving the paging message including the first category to which the terminal device belongs, the network device may determine the wake up signal corresponding to the first category and the grouping factor, based on the first category, the grouping factor, and the mapping relationship between category information and a wake up signal. The wake up signal corresponding to the first category and the grouping factor is the wake up signal that needs to wake up the terminal device. This wake up signal and the to-be-monitored wake up signal that is determined by the terminal device in the plurality of wake up signals in S304 are a same wake up signal. In this way, the terminal device is woken up by using this wake up signal, thereby implementing paging of the terminal device.

Optionally, when determining the to-be-monitored wake up signal in the plurality of wake up signals based on the first category and the grouping factor, the network device may similarly determine the to-be-monitored wake up signal in the plurality of wake up signals by using the following two methods. The two methods are as follows:

Method 1: First, a plurality of to-be-determined wake up signals may be determined in the plurality of wake up signals based on the first category. Then, the to-be-monitored wake up signal is determined in the plurality of to-be-determined wake up signals based on the grouping factor.

Method 2: First, a plurality of to-be-determined wake up signals may be determined in the plurality of wake up signals based on the grouping factor. Then, the to-be-monitored wake up signal is determined in the plurality of to-be-determined wake up signals based on the first category.

It should be noted that, for the network device, for a specific process of determining the to-be-monitored wake up signal in the plurality of wake up signals based on the first category and the grouping factor, refer to the descriptions of determining, by the terminal device, the to-be-monitored wake up signal in the plurality of wake up signals based on the first category and the grouping factor in S304. Details are not described herein again in this embodiment of this application.

In addition, it should be further noted that, because a process of classifying terminal devices based on service features is negotiated by the terminal device and the core network device, and is transparent to the network device, when the network device does not support classifying terminal devices based on service features, both the terminal device and the network device may determine the to-bemonitored signal in a fallback mechanism. In other words, reference may be made to a method in a current technology, to perform a modulo-N operation on identifiers of terminal devices, divide the terminal devices into groups based on remainders obtained after the modulo-N operation, and then determine the wake up signal that needs to wake up the terminal device, namely, a to-wake-up signal, based on a relationship between a group and a wake up signal. Alternatively, when the category information supported by the network device is less than categories negotiated by the terminal device and the core network device, for example, the category information negotiated by the terminal device and the core network device includes the high probability, the medium probability, and the low probability, but the network device supports only two categories: the medium probability and the low probability, the network device broadcasts, to a terminal device in a cell, a configuration of a plurality of wake up signals corresponding to the two types of wake up signals: the medium probability and the low probability, so that after receiving the configuration of the plurality of wake up signals that is broadcast by the network device, the terminal device determines the to-be-monitored wake up signal in the plurality of wake up signals based on the configuration, received by the terminal device, of the plurality of wake up signals corresponding to the two types of wake up signals: the medium probability and the low probability.

S307: The network device sends the to-be-monitored wake up signal to the terminal device based on the identifier of the terminal device.

Because the paging message received by the network device includes the identifier of the paged terminal device, after determining the to-be-monitored wake up signal in the plurality of wake up signals based on the first category and the grouping factor, the network device may determine the paged terminal device based on the identifier of the terminal device, and send the to-be-monitored wake up signal to the terminal device, to wake up the terminal device by using the to-be-monitored wake up signal.

S308: The terminal device monitors the to-be-monitored wake up signal.

After determining, in S304, the to-be-monitored wake up signal that needs to be monitored, the terminal device monitors a configuration of the to-be-monitored wake up signal to monitor the to-be-monitored wake up signal. Therefore, it can be learned that, compared with the current technology, according to the wake up signal sending method provided in this embodiment of this application, a group to which the terminal device belongs is not simply determined based on the identifier of the terminal device, but the service feature of the terminal device is considered, and the first category to which the terminal device belongs is determined based on the service feature of the terminal device. In this way, the to-be-monitored wake up signal may be determined in the plurality of wake up signals based on both the grouping factor and the first category that is corresponding to the service feature, so that a false alarm probability of paging is decreased, thereby reducing power consumption of a terminal device that is not paged.

It should be noted that, after the to-be-monitored wake up signal is detected based on the configuration of the to-be-monitored wake up signal, if the to-be-monitored wake up signal indicates that the terminal device is to be paged, a physical downlink control channel is monitored in a paging subframe corresponding to the to-be-monitored wake up signal; or if the to-be-monitored wake up signal indicates that the terminal device is not to be paged, a physical downlink control channel is not monitored in a paging subframe corresponding to the to-be-monitored wake up signal, in other words, the terminal device may continue to maintain a current sleep state or power saving state.

In this possible implementation, for example, the terminal device includes a water meter, a smoke alarm, a mobile phone, and a computer. The core network device may determine, based on service features of the water meter and the smoke alarm, that a category to which the water meter and the smoke alarm belong is the category of uplink service trigger, and determine, based on service features of the mobile phone and the computer, that a category to which the mobile phone and the computer belong is the category of the downlink service trigger. In addition, after separately determining the categories to which the water meter, the smoke alarm, the mobile phone, and the computer respectively belong, the core network device sends the categories to which the water meter, the smoke alarm, the mobile phone, and the computer respectively belong to the corresponding water meter, smoke alarm, mobile phone, and computer. In addition, the water meter, the smoke alarm, the mobile phone, and the computer all receive a configuration of a plurality of wake up signals sent by the network device. For the configuration of the plurality of wake up signals, refer to the foregoing Table 2. Wake up signals corresponding to the category of the uplink service trigger are a wake up signal 1, a wake up signal 2, a wake up signal 3, and a wake up signal 4, and wake up signals corresponding to the category of the downlink service trigger are a wake up signal 5, a wake up signal 6, a wake up signal 7, and a wake up signal 8. For the water meter, the water meter may determine to-be-determined wake up signals in the eight wake up signals based on the category of the uplink service trigger to which the water meter belongs. The to-be-determined wake up signals are the wake up signal 1, the wake up signal 2, the wake up signal 3, and the wake up signal 4. Then, the water meter further determines the to-be-monitored wake up signal that the water meter needs to monitor in the four to-be-determined wake up signals: the wake up signal 1, the wake up signal 2, the wake up signal 3, and the wake up signal 4, based on a remainder obtained after the modulo-4 operation is performed on an identifier of the water meter. If the remainder obtained after the modulo-4 operation is performed on the identifier of the watch is 0, the water meter may determine, based on the group 1, that the to-be-monitored signal that the water meter needs to monitor is 1, and monitor the wake up signal 1. For the smoke alarm, the smoke alarm may determine to-be-determined wake up signals in the eight wake up signals based on the category of the uplink service trigger to which the smoke alarm belongs. The to-be-determined wake up signals are the wake up signal 1, the wake up signal 2, the wake up signal 3, and the wake up signal 4. Then, the smoke alarm further determines the to-be-monitored wake up signal that the smoke alarm needs to monitor in the four to-be-determined wake up signals: the wake up signal 1, the wake up signal 2, the wake up signal 3, and the wake up signal 4, based on a remainder obtained after the modulo-4 operation is performed on an identifier of the smoke alarm. If the remainder obtained after the modulo-4 operation is performed on the identifier of the smoke alarm is 2, the smoke alarm may determine, based on the group 3, that the to-be-monitored signal that the water meter needs to monitor is 3, and monitor the wake up signal 3. For the mobile phone, the mobile phone may determine to-be-determined wake up signals in the eight wake up signals based on the category of the downlink service trigger to which the mobile phone belongs. The to-be-determined wake up signals are the wake up signal 5, the wake up signal 6, the wake up signal 7, and the wake up signal 8. Then, the mobile phone further determines the to-be-monitored wake up signal that the mobile phone needs to monitor in the four to-be-determined wake up signals: the wake up signal 5, the wake up signal 6, the wake up signal 7, and the wake up signal 8, based on a remainder obtained after the modulo-4 operation is performed on an identifier of the mobile phone. If the remainder obtained after the modulo-4 operation is performed on the identifier of the smoke alarm is 1, the mobile phone may determine, based on the group 2, that the to-be-monitored signal that the water meter needs to monitor is 6, and monitor the wake up signal 6. For the computer, the computer may determine to-be-determined wake up signals in the eight wake up signals based on the category of the downlink service trigger to which the computer belongs. The to-be-determined wake up signals are the wake up signal 5, the wake up signal 6, the wake up signal 7, and the wake up signal 8. Then, the computer further determines the to-be-monitored wake up signal that the computer needs to monitor in the four to-be-determined wake up signals: the wake up signal 5, the wake up signal 6, the wake up signal 7, and the wake up signal 8, based on a remainder obtained after the modulo-4 operation is performed on an identifier of the computer. If the remainder obtained after the modulo-4 operation is performed on the identifier of the smoke alarm is 3, the computer may determine, based on the group 4, that the to-be-monitored signal that the water meter needs to monitor is 8, and monitor the wake up signal 8. In this way, when the core network device pages the mobile phone by using the wake up signal 6, for the water meter, the smoke alarm, the mobile phone, and the computer that are monitoring wake up signals, only the mobile phone can detect the wake up signal 6 and be woken up by the wake up signal 6. None of the water meter, the smoke alarm, and the computer detects the wake up signal 6 and is woken up. This reduces false alarm probabilities of paging of the water meter, the smoke alarm, and the computer, thereby reducing power consumption of the water meter, the smoke alarm, and the computer that are not paged.

Figure 4:
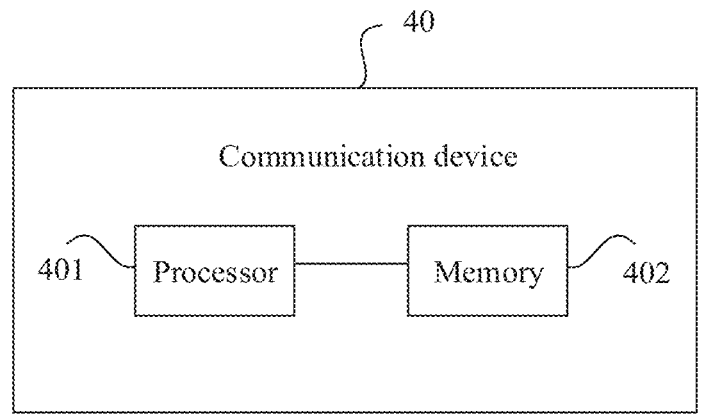
FIG. 4 is a schematic structural diagram of a communication device according to an embodiment of this application.

FIG. 4 is a schematic structural diagram of a communication device 40 according to an embodiment of this application. Referring to FIG. 4, the communication device 40 may include a processor 401. The processor 401 is configured to: be coupled to a memory 402, and read and execute instructions in the memory 402, to implement the wake up signal sending method shown in any implementation of the first aspect.

Optionally, the communication device 40 may further include: the memory 402.

The communication device 40 shown in this embodiment of this application may perform the technical solution of the wake up signal sending method that is on a terminal device side and that is shown in any one of the foregoing embodiments. Implementation principles and beneficial effects of the communication device 40 are similar to those of the wake up signal sending method, and details are not described herein again.

Figure 5:
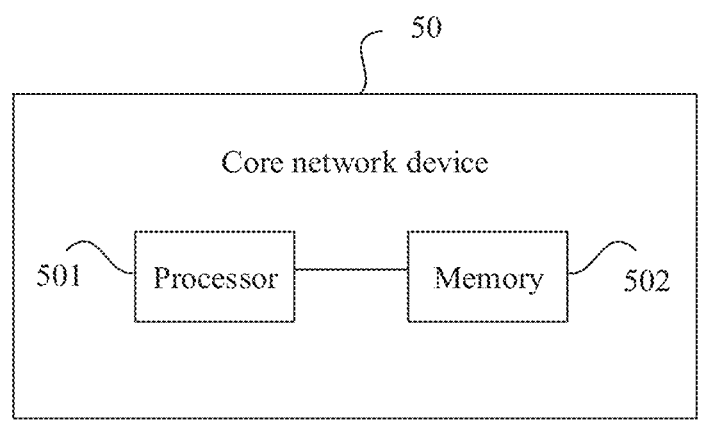
FIG. 5 is a schematic structural diagram of a core network device according to an embodiment of this application.

FIG. 5 is a schematic structural diagram of a core network device 50 according to an embodiment of this application. Referring to FIG. 5, the core network device 50 may include a processor 501. The processor 501 is configured to: be coupled to a memory 502, and read and execute instructions in the memory 502, to implement the wake up signal sending method shown in any implementation of the second aspect.

Optionally, the core network device 50 may further include: the memory 502.

The core network device 50 shown in this embodiment of this application may perform the technical solution of the wake up signal sending method that is on a core network device side and that is shown in any one of the foregoing embodiments. Implementation principles and beneficial effects of the core network device 50 are similar to those of the wake up signal sending method, and details are not described herein again.

Figure 6:
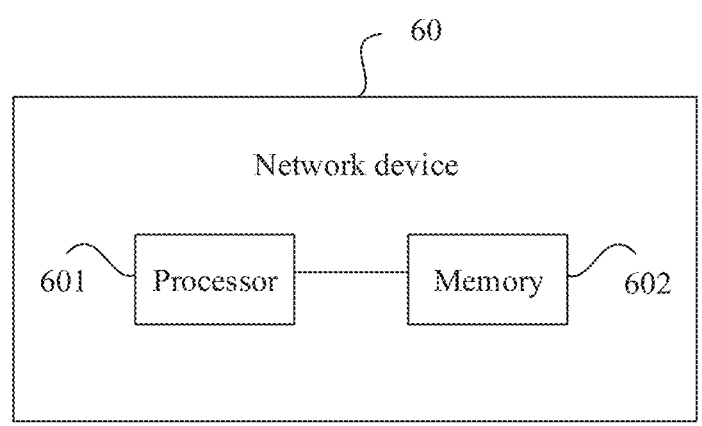
FIG. 6 is a schematic structural diagram of a network device according to an embodiment of this application.

FIG. 6 is a schematic structural diagram of a network device 60 according to an embodiment of this application. Referring to FIG. 6, the network device 60 may include a processor 601. The processor 601 is configured to: be coupled to a memory 602, and read and execute instructions in the memory 602, to implement the wake up signal sending method shown in any implementation of the third aspect.

Optionally, the network device 60 may further include: the memory 602.

The network device 60 shown in this embodiment of this application may perform the technical solution of the wake up signal sending method that is on a network device side and that is shown in any one of the foregoing embodiments. Implementation principles and beneficial effects of the network device 60 are similar to those of the wake up signal sending method, and details are not described herein again.

An embodiment of this application further provides a computer storage medium. The computer storage medium includes instructions. When the instructions are run on a communication device, the communication device is enabled to perform the wake up signal sending method shown in any implementation of the first aspect. Implementation principles and beneficial effects of the computer storage medium are similar to those of the wake up signal sending method, and details are not described herein again.

An embodiment of this application further provides a computer storage medium. The computer storage medium includes instructions. When the instructions are run on a core network device, the core network device is enabled to perform the wake up signal sending method shown in any implementation of the second aspect. Implementation principles and beneficial effects of the computer storage medium are similar to those of the wake up signal sending method, and details are not described herein again.

An embodiment of this application further provides a computer storage medium. The computer storage medium includes instructions. When the instructions are run on a network device, the network device is enabled to perform the wake up signal sending method shown in any implementation of the third aspect. Implementation principles and beneficial effects of the computer storage medium are similar to those of the wake up signal sending method, and details are not described herein again.

An embodiment of this application further provides a chip. The chip stores a computer program. When the computer program is executed by a processor, the wake up signal sending method shown in any one of the foregoing embodiments is performed. Implementation principles and beneficial effects of the chip are similar to those of the wake up signal sending method, and details are not described herein again.

An embodiment of this application further provides a communication system. The communication system includes the core network device and the network device shown in any one of the foregoing embodiments. The core network device is configured to perform the foregoing wake up signal sending method on a core network device side. The network device is configured to perform the foregoing wake up signal sending method on a network device side. Implementation principles and beneficial effects of the communication system are similar to those of the wake up signal sending methods, and details are not described herein again.

Optionally, the communication system may further include a terminal device. The terminal device is configured to perform a wake up signal sending method on a terminal device side.

The processor in the foregoing embodiments may be a general-purpose processor, a digital signal processor (DSP), an application-specific integrated circuit (ASIC), a field programmable gate array (FPGA) or another programmable logic device, a discrete gate or transistor logic device, or a discrete hardware component. The methods, steps, and logical block diagrams that are disclosed in the embodiments of this application may be implemented or performed. The general-purpose processor may be a microprocessor, or the processor may be any conventional processor, or the like. The steps of the method disclosed with reference to the embodiments of this application may be directly performed and completed by using a hardware decoding processor, or may be performed and completed by using a combination of hardware and software modules in a decoding processor. A software module may be located in a mature storage medium in the art, such as a random access memory (RAM), a flash memory, a read-only memory (ROM), a programmable read-only memory, an electrically erasable programmable memory, a register, or the like. The storage medium is located in the memory, and the processor reads the instructions from the memory and completes the steps of the foregoing methods in combination with hardware in the processor.

In the several embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in this application.

In addition, the functional units in the embodiments of this application may be integrated into one processing unit, or each of the units may exist alone physically, or two or more units may be integrated into one unit. The integrated unit may be implemented in a form of hardware, or may be implemented in a form of hardware plus a software functional unit.

What is claimed is:

1. A method for receiving wake-up signals, comprising:
   receiving, from a core network device, a first category which a terminal device belongs to, wherein the first category corresponds to a first service feature and the first category is a probability value that the terminal device is paged;
   receiving, from a network device, a configuration of a plurality of wake-up signals;
   determining a to-be-monitored wake-up signal in the plurality of wake-up signals based on the first category; and
   monitoring the to-be-monitored wake-up signal.

2. The method according to claim 1, wherein the first service feature comprises at least one of a probability that the terminal device is paged, an uplink service trigger type, or a downlink service trigger type.

3. The method according to claim 1, wherein the configuration of the plurality of wake-up signals comprises a mapping relationship between category information and a wake-up signal; and wherein the to-be-monitored wake-up signal is determined based on the first category and the mapping relationship.

4. The method according to claim 1, wherein the to-be-monitored wake-up signal is determined based on the first category and a grouping factor.

5. The method according to claim 4, wherein determining the to-be-monitored wake-up signal in the plurality of wake-up signals based on the first category comprises:
   determining a plurality of to-be-determined wake-up signals in the plurality of wake-up signals based on the first category; and
   determining the to-be-monitored wake-up signal in the plurality of to-be-determined wake-up signals based on the grouping factor.

6. The method according to claim 1, comprising:
   sending, to the core network device, a service feature of the terminal device.

7. The method according to claim 1, comprising:
   when the to-be-monitored wake-up signal indicates that the terminal device is to be paged, monitoring a physical downlink control channel in a paging subframe corresponding to the to-be-monitored wake-up signal; or
   when the to-be-monitored wake-up signal indicates that the terminal device is not to be paged, skipping monitoring a physical downlink control channel in a paging subframe corresponding to the to-be-monitored wake-up signal.

8. A method, comprising:
   sending, to a terminal device, a first category which the terminal device belongs to, wherein the first category corresponds to a first service feature, and the first category is a probability value that the terminal device is paged; and
   sending, to a network device, a paging message, wherein the paging message comprises an identifier of the terminal device and the first category, and wherein the paging message indicates the network device to determine a to-be-monitored wake-up signal in a plurality of wake-up signals based on the first category and to send the to-be-monitored wake-up signal to the terminal device based on the identifier of the terminal device.

9. The method according to claim 8, wherein the first service feature comprises at least one of a probability that the terminal device is paged, an uplink service trigger type, or a downlink service trigger type.

10. The method according to claim 8, comprising:
    determining based on a service feature of the terminal device, the first category which the terminal device belongs to.

11. A communication apparatus, comprising:
at least one processor, configured to:
  receive, from a core network device, a first category which a terminal device belongs to, wherein the first category corresponds to a first service feature, and the first category is a probability value that the terminal device is paged;
  receive, from a network device, a configuration of a plurality of wake-up signals;
  determine a to-be-monitored wake-up signal in the plurality of wake-up signals based on the first category; and
  monitor the to-be-monitored wake-up signal.

12. The communication apparatus according to claim 11, wherein the first service feature comprises at least one of a probability that the terminal device is paged, an uplink service trigger type, or a downlink service trigger type.

13. The communication apparatus according to claim 11, wherein the configuration of the plurality of wake-up signals comprises a mapping relationship between category information and a wake-up signal, and wherein the to-be-monitored wake-up signal is determined based on the first category and the mapping relationship.

14. The communication apparatus according to claim 11, wherein the to-be-monitored wake-up signal is determined based on the first category and a grouping factor.

15. The communication apparatus according to claim 14, wherein the determine a to-be-monitored wake-up signal in the plurality of wake-up signals based on the first category comprises:
  determine a plurality of to-be-determined wake-up signals in the plurality of wake-up signals based on the first category; and
  determine the to-be-monitored wake-up signal in the plurality of to-be-determined wake-up signals based on the grouping factor.

16. The communication apparatus according to claim 11, wherein the at least one processor is configured to:
  send, to the core network device, a service feature of the terminal device.

17. The communication apparatus according to claim 11, wherein the at least one processor is configured to:
  when the to-be-monitored wake-up signal indicates that the terminal device is to be paged, monitor a physical downlink control channel in a paging subframe corresponding to the to-be-monitored wake-up signal; or
  when the to-be-monitored wake-up signal indicates that the terminal device is not to be paged, skip monitoring a physical downlink control channel in a paging subframe corresponding to the to-be-monitored wake-up signal.

18. A communication apparatus, comprising:
at least one processor, configured to:
  send, to a terminal device, a first category which the terminal device belongs to, wherein the first category corresponds to a first service feature, and the first category is a probability value that the terminal device is paged; and
  send, to a network device, a paging message, wherein the paging message comprises an identifier of the terminal device and the first category, and wherein the paging message indicates the network device to determine a to-be-monitored wake-up signal in a plurality of wake-up signals based on the first category and to send the to-be-monitored wake-up signal to the terminal device based on the identifier of the terminal device.

19. The communication apparatus according to claim 18, wherein the first service feature comprises at least one of a probability that the terminal device is paged, an uplink service trigger type, or a downlink service trigger type.

20. The communication apparatus according to claim 18, wherein the at least one processor is configured to:
  determine, based on a service feature of the terminal device, the first category which the terminal device belongs to.

* * * * *

UNITED STATES PATENT AND TRADEMARK OFFICE
CERTIFICATE OF CORRECTION

| | | |
|---|---|---|
| PATENT NO. | : 12,108,335 B2 | Page 1 of 1 |
| APPLICATION NO. | : 17/370474 | |
| DATED | : October 1, 2024 | |
| INVENTOR(S) | : Baokun Shan et al. | |

It is certified that error appears in the above-identified patent and that said Letters Patent is hereby corrected as shown below:

On the Title Page

In Column 2 (Other Publications), In Line 1, Delete "Lenova" and insert -- Lenovo --.

Signed and Sealed this
Eleventh Day of February, 2025

Coke Morgan Stewart
*Acting Director of the United States Patent and Trademark Office*